(12) United States Patent
Hawkins

(10) Patent No.: US 6,210,106 B1
(45) Date of Patent: Apr. 3, 2001

(54) SEAL APPARATUS FOR GAS TURBINE ENGINE VARIABLE VANE

(75) Inventor: James T. Hawkins, Loveland, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/302,968

(22) Filed: Apr. 30, 1999

(51) Int. Cl.[7] .............................. B63H 1/06; F01D 7/00; F03D 3/14
(52) U.S. Cl. ............................................ 415/160; 415/230
(58) Field of Search .................... 415/148, 151, 415/159, 160, 230, 231

(56) References Cited

U.S. PATENT DOCUMENTS

| | | | |
|---|---|---|---|
| 4,990,056 | * | 2/1991 | McClain et al. ...................... 416/160 |
| 5,039,277 | * | 8/1991 | Naudet .............................. 415/160 X |
| 5,277,544 | * | 1/1994 | Naudet ................................. 416/160 |
| 5,324,165 | * | 6/1994 | Charbonnel et al. ................. 416/160 |

* cited by examiner

Primary Examiner—John E. Ryznic
(74) Attorney, Agent, or Firm—Andrew C. Hess; Nathan D. Herkamp

(57) ABSTRACT

The present invention provides a sealing apparatus for sealing leakage around a trunnion assembly of a gas turbine engine variable vane rotatably supported by an engine casing. The apparatus includes a trunnion of the variable vane rotatable about a trunnion axis, radially spaced apart inner and outer casing bores circumscribed about the trunnion axis and disposed radially outward of the engine centerline through the casing, and the trunnion rotatably disposed within the inner and outer casing bores. The inner bore is wider than the outer bore forming an annular shoulder with a planar radially inwardly facing shoulder surface. An annular recess in the trunnion has a planar radially inwardly facing recess surface substantially co-planar with the shoulder surface. A sealing ring is radially slidably disposed about the trunnion below the outer recess surface and has a radially outwardly facing sealing surface substantially co-extensive in a direction perpendicular to the trunnion axis and sealable with both the outer recess surface and the shoulder surface.

20 Claims, 1 Drawing Sheet

SEAL APPARATUS FOR GAS TURBINE ENGINE VARIABLE VANE

BACKGROUND OF THE INVENTION

1. Field of the Invention

The present invention relates generally to aircraft gas turbine engine variable stator vanes and, more particularly, seals deposed around trunnions of such vanes.

2. Disscussion of the Background Art

A typical gas turbine engine compressor includes several rows or stages of interdigitated compressor stator vanes and corresponding rows or stages of compressor rotor blades. As ambient air flows through each succeeding compressor stage during operation, it is successively compressed for providing compressed air to a combustor located downstream therefrom, wherein it is mixed with fuel and ignited for generating hot combustion gases which power the engine. One or more rows of compressor stator vanes are variable for allowing each vane to rotate around a longitudinal or radial axis to adjust the angular orientation of the vane relative to the airflow. This improves the efficiency and overall operation of the compressor. Variable stator vanes typically include an integral outer trunnion disposed in a stator casing for allowing angular adjustment of the vane relative to the airflow thereover. In a typical compressor, the trunnion is pivotally mounted in a bushing in the casing of the compressor or in a complementary mounting boss on the casing.

One problem with current designs is that compressor air leaks through air seals around the trunnion. Aerodynamic forces, acting on the vane, orients the vane into a cocked position opening up or increasing area of a leakage path. The leakage path allows compressed hot air to flow by the bushing degrading the bushing by oxidation of the resin system. One type of bushing material is a high temperature polyamide composite laminates. The high temperature air leak can exceed 700 degrees F in some applications and decompose the polyamide bushing materials causing severe bushing degradation due to erosion and oxidation of the resin matrix. This in turn leads to further degradation due to loss of the fiber because of fatigue failure. Manufacturing tolerances and maintenance practices are also known to causes larger leakage passages. Therefore, it is highly desirable to improve sealing effectiveness of variable vane assemblies having a trunnion and a bushing between the trunnion and the engine casing.

SUMMARY OF THE INVENTION

The present invention provides a sealing apparatus for sealing a gas turbine engine variable vane rotatably supported by an engine casing circumscribed about an engine centerline. The apparatus includes a trunnion of the variable vane rotatable about a trunnion axis, radially spaced apart inner and outer casing bores circumscribed about the trunnion axis and disposed radially outward of the engine centerline through the casing, and the trunnion rotatably disposed within the inner and outer casing bores. The inner bore is wider than the outer bore forming an annular shoulder with a planar radially inwardly facing shoulder surface. An annular recess in the trunnion has a planar radially inwardly facing recess surface substantially co-planar with the shoulder surface. A sealing ring is radially slidably disposed about the trunnion below the outer recess surface and has a radially outwardly facing sealing surface substantially co-extensive in a direction perpendicular to the trunnion axis and sealable with both the outer recess surface and the shoulder surface.

ADVANTAGES OF THE INVENTION

The present invention improves performance of the compressor and engine, durability of the bushing materials, and reliability of the compressor. The invention prevents or reduces leakage of high temperature air around the bushings at a high rate. This, in turn, prevents or reduces oxidization of the resin in composite bushing materials which would otherwise allow high pressure air from escaping the compressor causing loss of efficiency, loss of Exhaust Gas Temperature (EGT) margin, and reduction of Specific Fuel Consumption (SFC).

The present invention provides good sealing at the trunnion and accommodates cocking of the vane due to aerodynamic forces imparted on the vane during engine operation. The present invention provides good sealing at the trunnion and accommodates large variations in sealing effectiveness between the bushing and the engine casing due to manufacturing tolerances and maintenance practices.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
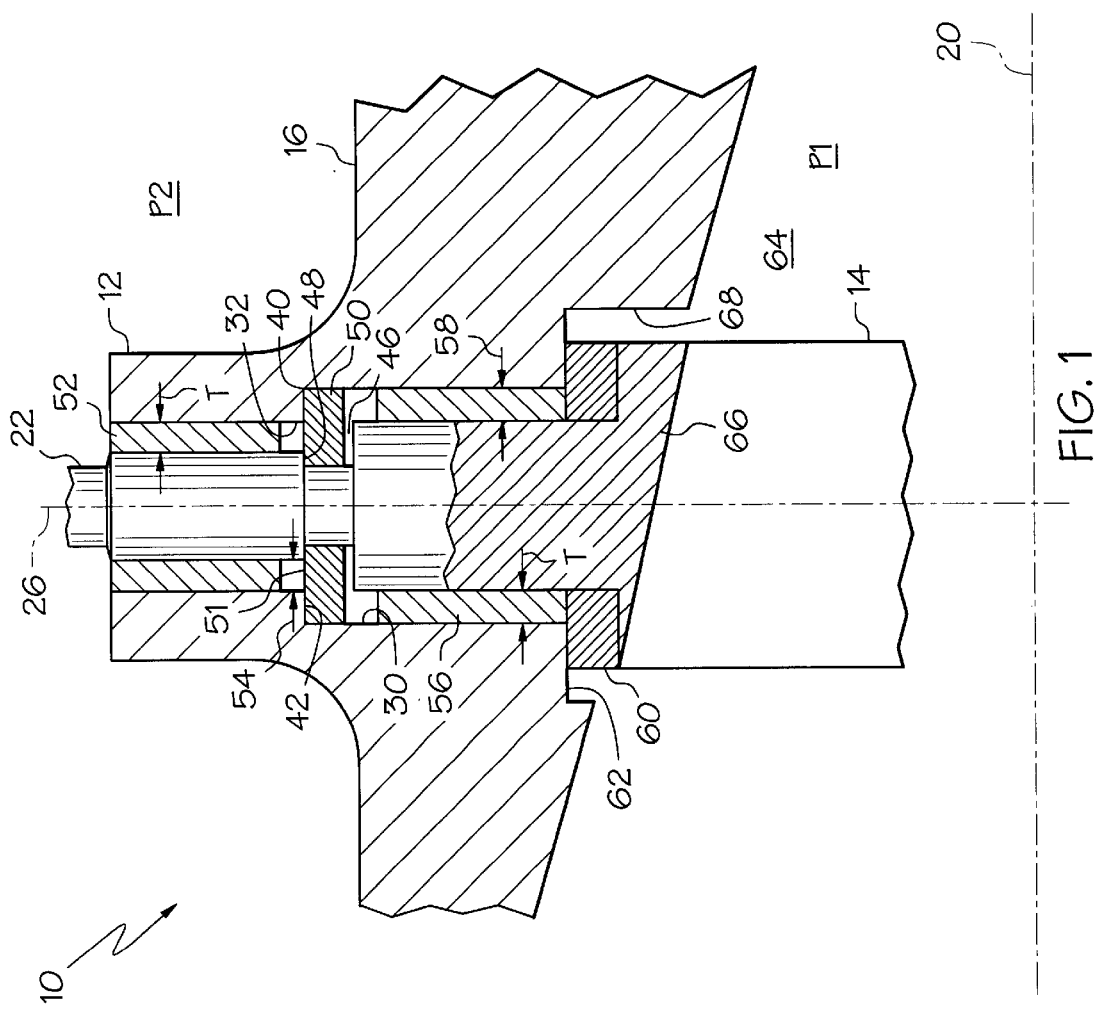
FIG. 1 is a cross-sectional illustrative view of a sealing apparatus for sealing a gas turbine engine variable vane in an exemplary embodiment of the present invention.

Illustrated in FIG. 1 is a schematic representation of a sealing apparatus 10 for sealing a gas turbine engine variable vane 14 rotatably supported within a boss 12 of an engine casing 16 circumscribed about an engine centerline 20 as is often used in compressor sections of gas turbine engines. The variable vane 14 includes a trunnion 22 rotatable about a trunnion axis 26. Radially spaced apart inner and outer casing bores 30 and 32, respectively, are circumscribed about the trunnion axis 26 and disposed radially outward of the engine centerline 20 through the casing 16. The trunnion 22 is rotatably disposed within the inner and outer casing bores 30 and 32, respectively.

The inner bore 30 is wider than the outer bore 32 forming an annular shoulder 40 with a planar radially inwardly facing shoulder surface 42. An annular recess, illustrated in the exemplary embodiment as a groove 46, in the trunnion 22 has a planar radially inwardly facing recess surface 48 substantially co-planar with the shoulder surface 42.

Figure 2:
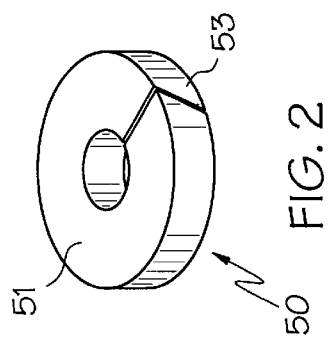
FIG. 2 is a perspective illustrative view of a spring ring in FIG. 1.

A split sealing ring 50, illustrated in more detail in FIG. 2, is radially slidably disposed about the trunnion 22 below the outer recess surface 48 and has a radially outwardly facing sealing surface 51 substantially co-extensive in a direction perpendicular to the trunnion axis 26 and sealable with both the outer recess surface 48 and the shoulder surface 42. The exemplary embodiment incorporating the groove 46 has the split sealing ring 50 disposed within the groove and the split ring is preferably a spring ring. A split 53 in the sealing ring 50 allows the sealing ring to be placed over the trunnion 22 and into the groove 46.

The preferred embodiment has an outer bushing 52 is disposed in an annular outer gap 54 between the outer casing bore 32 and the trunnion 22 and is located radially outward of the sealing ring 50. An inner bushing 56 is disposed in an annular inner gap 58 between the inner casing bore 30 and the trunnion 22 and is located radially inward of the sealing ring 50. An annular axial bushing 60 is disposed around the said trunnion 22 between a radially inwardly facing surface 62 of the casing 16 along an engine flowpath 64 and a radially outer platform 66 of the vane 14 from which the trunnion 22 extends. The radially inwardly facing surface 62 is preferably within a counterbore 68 of the inner bore 30. In the preferred embodiment, the inner bushing 56 is wider than the outer bushing 52 and both bushings have the same wall thickness T.

During engine operation flowpath air pressure P1, radially inward of the engine casing 16, is greater than outer air pressure P2, radially outward of the engine casing 16, creating a pressure differential across the casing. The pressure differential causes any leakage through the assembly of the boss 12 and bushings. The sealing ring 50 reacts to the pressure differential by moving radially outward and to simultaneously press against the shoulder surface 42 and the recess surface 48, thus, sealing off any leakage flow through the casing 16 through the inner and outer casing bores 30 and 32 and around or through the inner and outer bushings 56 and 52, respectively.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention Accordingly, what is desired to be secured by Letters Patent of the United States is the invention as defined and differentiated in the following claims:

What is claimed is:

1. A sealing apparatus for sealing a gas turbine engine variable vane rotatably supported by an engine casing circumscribed about an engine centerline, said apparatus comprising:
    a trunnion of the variable vane rotatable about a trunnion axis;
    inner and outer casing bores circumscribed about said trunnion axis and disposed radially outward of the engine centerline through the casing;
    said trunnion rotatably disposed within said inner and outer casing bores;
    said inner bore being wider than said outer bore forming an annular shoulder with a planar radially inwardly facing shoulder surface;
    an annular recess in said trunnion, said recess having a planar radially inwardly facing recess surface substantially co-planar with said shoulder surface;
    a sealing ring radially slidably disposed about said trunnion below said outer recess surface; and
    said sealing ring having a radially outwardly facing sealing surface substantially co-extensive in a direction perpendicular to said trunnion axis and sealable with both said outer recess surface and said shoulder surface.

2. An apparatus as claimed in claim 1 further comprising an outer bushing disposed in an annular outer gap between said outer casing bore and said trunnion and radially outward of said sealing ring.

3. An apparatus as claimed in claim 2 further comprising an inner bushing disposed in an annular inner gap between said inner bore and said trunnion and radially inward of said sealing ring.

4. An apparatus as claimed in claim 3 further comprising an annular axial bushing disposed around said trunnion between with a radially inwardly facing surface of the casing along an engine flowpath and a radially outer platform from which said trunnion extends.

5. An apparatus as claimed in claim 4 wherein said radially inwardly facing surface of the casing is in a counterbore of said inner bore.

6. An apparatus as claimed in claim 4 wherein said sealing ring is a snap ring.

7. A sealing apparatus for sealing a gas turbine engine variable vane rotatably supported by an engine casing circumscribed about an engine centerline, said apparatus comprising:
    a trunnion of the variable vane rotatable about a trunnion axis;
    inner and outer casing bores circumscribed about said trunnion axis and disposed radially outward of the engine centerline through the casing;
    annular inner and outer bushings disposed in annular inner and outer gaps between said inner and outer casing bores respectively and said trunnion;
    inner and outer trunnion sections disposed in said inner and outer bushings respectively;
    an annular groove in said trunnion positioned between said inner and outer trunnion sections;
    said groove having a planar radially inwardly facing groove surface substantially co-planar with said shoulder surface;
    a split sealing ring radially slidably disposed within said groove; and
    said sealing ring having a radially outwardly facing sealing surface substantially co-extensive in a direction perpendicular to said trunnion axis and sealable with both said groove surface and said shoulder surface.

8. An apparatus as claimed in claim 7 wherein said inner trunnion section is wider than said outer trunnion section.

9. An apparatus as claimed in claim 8 wherein said annular inner and outer bushings have substantially equal annular inner and outer wall thicknesses respectively.

10. An apparatus as claimed in claim 9 further comprising an annular axial bushing disposed around said trunnion between with a radially inwardly facing surface of the casing along an engine flowpath and a radially outer platform from which said trunnion extends.

11. An apparatus as claimed in claim 10 wherein said radially inwardly facing surface of the casing is in a counterbore of said inner bore.

12. An apparatus as claimed in claim 11 wherein said sealing ring is a snap ring.

13. A variable vane apparatus for a gas turbine engine, said apparatus comprising:
    an engine casing rotatably supporting a variable vane and circumscribed about an engine centerline,
    a trunnion of the variable vane rotatable about a trunnion axis;
    inner and outer casing bores circumscribed about said trunnion axis and disposed radially outward of the engine centerline through the casing;
    annular inner and outer bushings disposed in annular inner and outer gaps between said inner and outer casing bores respectively and said trunnion;
    inner and outer trunnion sections disposed in said inner and outer bushings respectively;
    an annular groove in said trunnion positioned between said inner and outer trunnion sections;

said groove having a planar radially inwardly facing groove surface substantially co-planar with said shoulder surface;

a split sealing ring radially slidably disposed within said groove; and said sealing ring having a radially outwardly facing sealing surface substantially co-extensive in a direction perpendicular to said trunnion axis and sealable with both said groove surface and said shoulder surface.

14. An apparatus as claimed in claim 13 wherein said inner trunnion section is wider than said outer trunnion section.

15. An apparatus as claimed in claim 14 wherein said annular inner and outer bushings have substantially equal annular inner and outer wall thicknesses respectively.

16. An apparatus as claimed in claim 15 further comprising an annular axial bushing disposed around said trunnion between with a radially inwardly facing surface of the casing along an engine flowpath and a radially outer platform from which said trunnion extends.

17. An apparatus as claimed in claim 16 wherein said radially inwardly facing surface of the casing is in a counterbore of said inner bore.

18. An apparatus as claimed in claim 17 wherein said sealing ring is a snap ring.

19. An apparatus as claimed in claim 13 further comprising a flowpath radially inward of said engine casing and across which said vane is disposed and which during engine operation has a flowpath air pressure greater than an outer air pressure radially outward of said engine casing.

20. An apparatus as claimed in claim 19 wherein said inner trunnion section is wider than said outer trunnion section and said annular inner and outer bushings have substantially equal annular inner and outer wall thicknesses respectively, and said apparatus further comprises an annular axial bushing disposed around said trunnion between with a radially inwardly facing surface of the casing along said engine flowpath and a radially outer platform from which said trunnion extends.

* * * * *